United States Patent
Hasegawa

[11] Patent Number: 5,563,944
[45] Date of Patent: Oct. 8, 1996

[54] ECHO CANCELLER WITH ADAPTIVE SUPPRESSION OF RESIDUAL ECHO LEVEL

[75] Inventor: Atsushi Hasegawa, Tokyo, Japan

[73] Assignee: NEC Corporation, Tokyo, Japan

[21] Appl. No.: 174,343

[22] Filed: Dec. 28, 1993

[30] Foreign Application Priority Data

Dec. 28, 1992 [JP] Japan ................................. 4-348963

[51] Int. Cl.$^6$ ................................................... H04B 3/20
[52] U.S. Cl. ........................... 379/410; 379/406; 370/32.1
[58] Field of Search .................................. 379/410, 406; 370/32.1

[56] References Cited

U.S. PATENT DOCUMENTS

| 3,821,494 | 6/1974 | Besseyre | 379/390 |
| 4,005,277 | 1/1977 | Araseki et al. | 379/406 |
| 4,232,400 | 5/1979 | Yamamoto et al. | 455/305 |
| 4,577,071 | 3/1986 | Johnston et al. | 379/410 |
| 4,852,161 | 7/1989 | Hagiwara | 379/410 |
| 4,894,820 | 1/1990 | Miyamoto et al. | 370/32.1 |
| 5,274,705 | 12/1993 | Younce et al. | 379/410 |
| 5,418,848 | 5/1995 | Armbruster | 379/406 |
| 5,418,849 | 5/1995 | Cannalire et al. | 379/410 |

FOREIGN PATENT DOCUMENTS

| 0135843 | 4/1985 | European Pat. Off. . |
| 0519551 | 12/1992 | European Pat. Off. . |

OTHER PUBLICATIONS

Telcom Report, vol. 10, Mar. 1987, pp. 82–87, "Echokompersator in weltweiter Nachrichlenverbindunger".

Primary Examiner—Krista M. Zele
Assistant Examiner—Gloria Tebcherani
Attorney, Agent, or Firm—Sughrue, Mion, Zinn, Macpeak & Seas

[57] ABSTRACT

In an echo cancelling device comprising an echo canceller 13 for producing, in response to a send-in signal SIN and a receive-in signal RIN, a residual signal RES in which an echo signal ECHO is cancelled, a residual echo level estimator 106 estimates, in response to the residual signal, a residual echo level in the residual signal and produces a threshold signal THR with a threshold level equal to the residual echo level. Responsive to the receive-in, the residual, and the threshold signals, a residual echo suppressor 105 produces a send-out signal SOUT with a residual echo adaptively suppressed in response to the threshold level. Preferably, the echo canceller comprises an echo estimating circuit 131 which estimates an echo estimation signal in response to the receive-in and the residual signals. A subtracter 132 subtracts the echo estimation signal from the send-in signal and produces the residual signal. Responsive to the send-in and the receive-in signals, a communication state detector 14 produces an inhibit signal INH when a level of the receive-in signal is greater than that of the send-in signal. The inhibit signal prevents the echo estimating circuit from producing the echo estimation signal and makes the residual echo level estimator keep the threshold level at the residual echo level estimated immediately before the inhibit signal is produced.

9 Claims, 4 Drawing Sheets

ECHO CANCELLER WITH ADAPTIVE SUPPRESSION OF RESIDUAL ECHO LEVEL

BACKGROUND OF THE INVENTION

This invention relates to an echo canceller operable as an echo cancelling device.

In a long-distance telephone network, a local telephone substation is connected through a hybrid transformer and a two-wire line to a plurality of remote telephone substations. An echo canceller is connected to the hybrid transformer between two wires of the two-wire line. A sent signal originates at the local telephone substation and is delivered through the hybrid transformer to the echo canceller and thence to the remote telephone substations. For reception at the local telephone substation, a received signal originates at one of the remote telephone substations and is delivered to the echo canceller and thence to the hybrid transformer.

It is usual in the art to refer to the sent signal as a send-in signal and a send-out signal while transmitted from the hybrid transformer to the echo canceller and from the echo canceller towards the remote telephone substations. The received signal is called a receive-in signal while transmitted from one of the two wires to an echo canceller.

As will later be described, a conventional echo cancelling device is not exempted from factors which deteriorate a quality of speech transmission either in a bidirectional communication state or when a channel noise or a background noise is high.

SUMMARY OF THE INVENTION

It is therefore an object of this invention to provide an echo cancelling device which can precisely judge a residual echo control operation by estimating a residual echo level and can suppress with no irrelevant feeling a residual echo, channel noise, and/or background noise to achieve a high quality of speech transmission even either in a bidirectional communication state or when the channel noise or the background noise is high.

Other objects of this invention will become clear as the description proceeds.

On setting forth the gist of this invention, it is possible to understand that an echo cancelling device comprises an echo canceller responsive to a send-in signal and a receive-in signal for producing a residual signal in which an echo signal is cancelled.

According to this invention, the above-understood echo cancelling device further comprises a residual echo level estimator responsive to the residual signal for estimating a residual echo level in the residual signal and for producing a threshold signal with a threshold level equal to the residual echo level; and a residual echo suppressor responsive to the receive-in signal, the residual signal, and the threshold signal for producing a send-out signal with a residual echo adaptively suppressed in response to the threshold level.

DESCRIPTION OF THE PREFERRED EMBODIMENT

Figure 1:
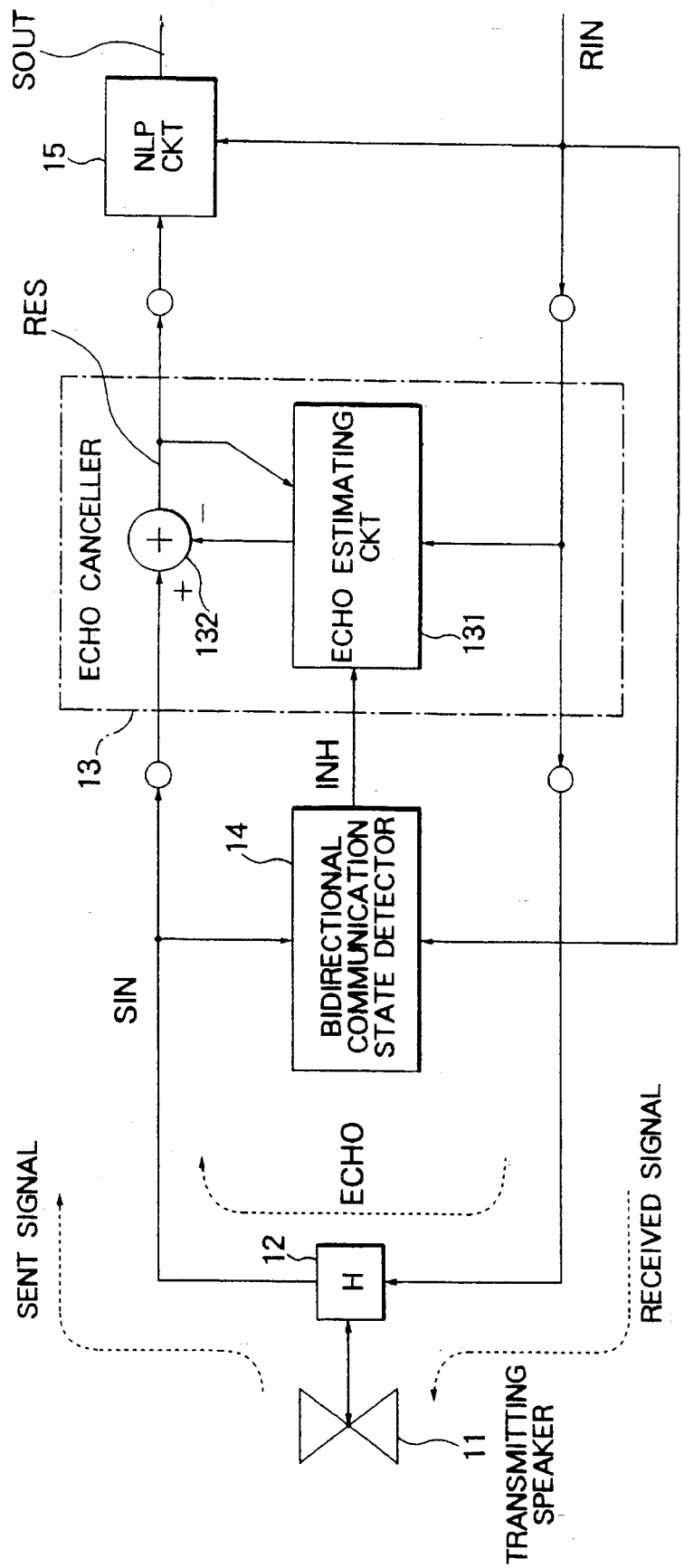
FIG. 1 is a block diagram of a conventional echo cancelling device.

Referring to FIG. 1, a conventional echo cancelling device will first be described for a better understanding of this invention. The echo cancelling device of FIG. 1 is used in suppression of an echo signal ECHO which results from an impedance mismatch at a hybrid transformer 12.

The echo cancelling device comprises an echo canceller 13. Responsive to a send-in signal SIN and a receive-in signal RIN, the echo canceller 13 produces a residual signal RES in which the echo signal ECHO is cancelled. The echo canceller 13 comprises an echo estimating circuit (namely, an echo path estimating circuit) 131 and a subtracter 132. Responsive to the receive-in signal RIN and the residual signal RES, the echo estimating circuit 131 estimates an echo estimation signal. The subtracter .132 subtracts the echo estimation signal from the send-in signal SIN and produces the residual signal RES.

The echo cancelling device further comprises a bidirectional communication state detector 14. Responsive to the send-in signal SIN and the receive-in signal RIN, the bidirectional communication state detector 14 produces an inhibit signal INH when the receive-in signal RIN has a level which is greater than that of the send-in signal SIN. Thus, the bidirectional communication state detector 14 produces the inhibit signal INH when a unidirectional communication state is brought about by a receiving speaker or talker (not shown) which is a counterpart of a transmitting speaker or talker 11 and which produces the receive-in signal RIN. The inhibit signal INH prevents the echo estimating circuit 131 from producing the echo estimation signal.

Figure 2:
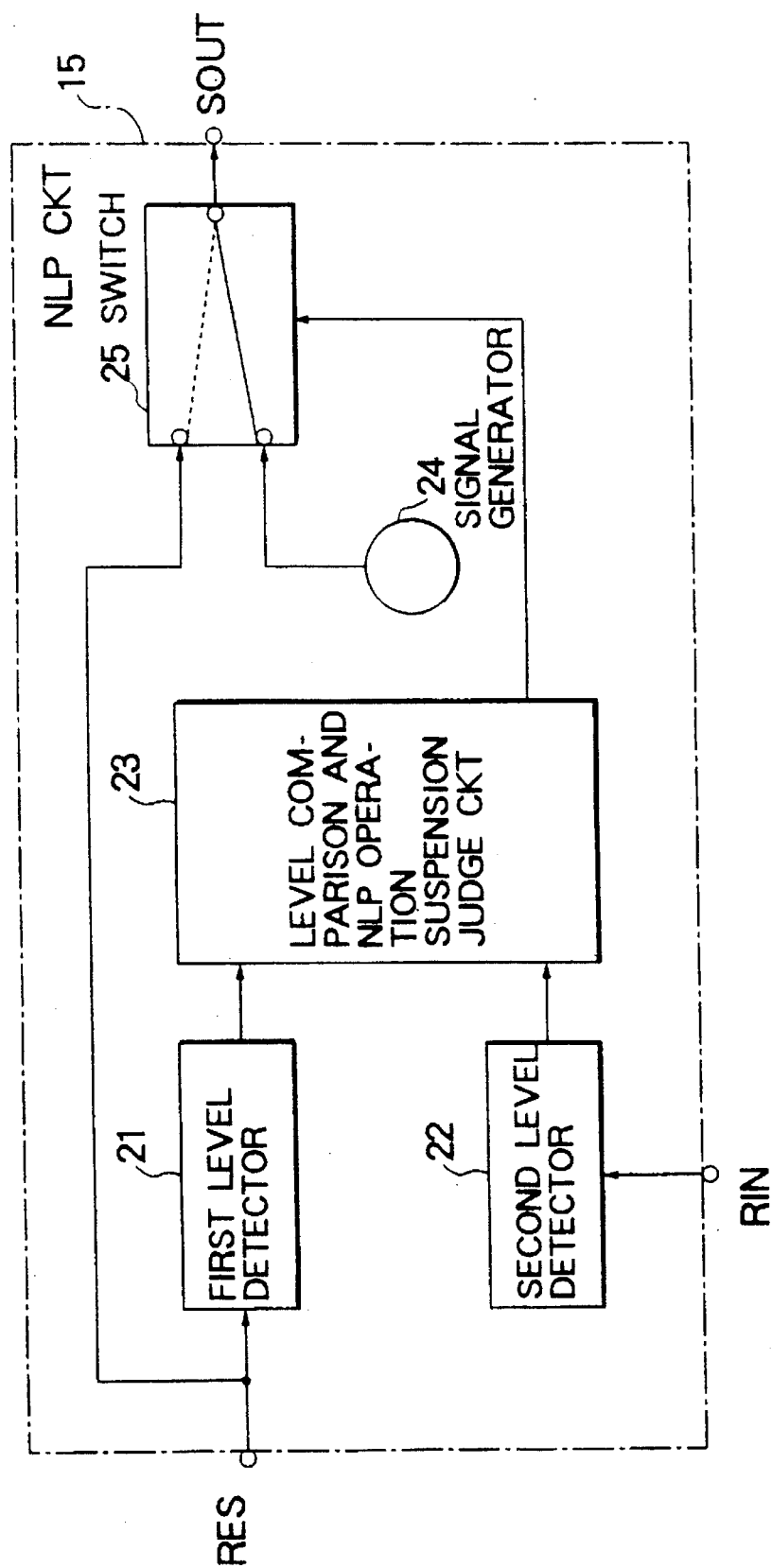
FIG. 2 is a block diagram of a center clipper circuit (an NLP circuit) used in the echo cancelling device illustrated in FIG. 1.

Thus, the echo canceller 13 estimates an echo path under a certain restriction. This results in remain of a residual echo even when an echo is cancelled with the echo path best estimated. In order to forcibly suppress such a residual echo, an NLP (nonlinear processor) circuit (namely, a center clipper circuit) 15 is used as a residual echo control circuit in the manner depicted in FIGS. 1 and 2. According to prior art, the NLP circuit 15 comprises a first level detector 21 for detecting a level of the residual signal RES and a second level detector 22 for detecting a level of the receive-in signal RIN. The NLP circuit 15 is put in operation by a level comparison and NLP operation suspension judge circuit 23 when a difference between an output of the first level detector 21 and another output of the second level detector 22 is judged to be higher than a certain value and furthermore when the level of the residual signal RES is judged to be lower than a certain value to switch the send-out signal SOUT from the residual signal RES to a generated signal of a low level (for example, white noise or quiescent) by a switch 25 and thereby to prevent the residual echo from leaking into the send-out signal SOUT while the unidirectional communication state is brought about by the receiving speaker. The generated signal is generated by a signal generator 24.

According to judgement of NLP (center clipper) operation by such level comparison, optimal judgement is not always insured either in a bidirectional communication state or when a channel noise level or a background noise level is high. As herein called, the optimal judgement means instantaneous suspension of the NLP operation upon occurrence of an interrupting signal produced by the transmitting speaker 11 and instantaneous activation of the NLP operation in the absence of such an interrupting signal. An error in the judgement results either in suppression of a speech signal of the transmitting speaker 11 or in return of the residual echo. When a method is adopted to switch into a certain signal upon initiation of the NLP operation, either a discontinuous feeling or an irrelevant feeling is unavoidable due to a signal level difference and/or a tone difference before and after switching. In this manner, the conventional echo cancelling device is not exempted from factors which deteriorate the quality of speech transmission either in the bidirectional communication state or when the channel noise or the background noise is high.

This invention has been invented in such backgrounds and provides an echo cancelling device which can precisely judge a residual echo control operation by estimating a residual echo level and can suppress with no irrelevant feeling the residual echo, the channel noise, and/or the background noise to achieve a high quality of speech transmission even either in the bidirectional communication state or when the channel noise or the background noise is high.

Figure 3:
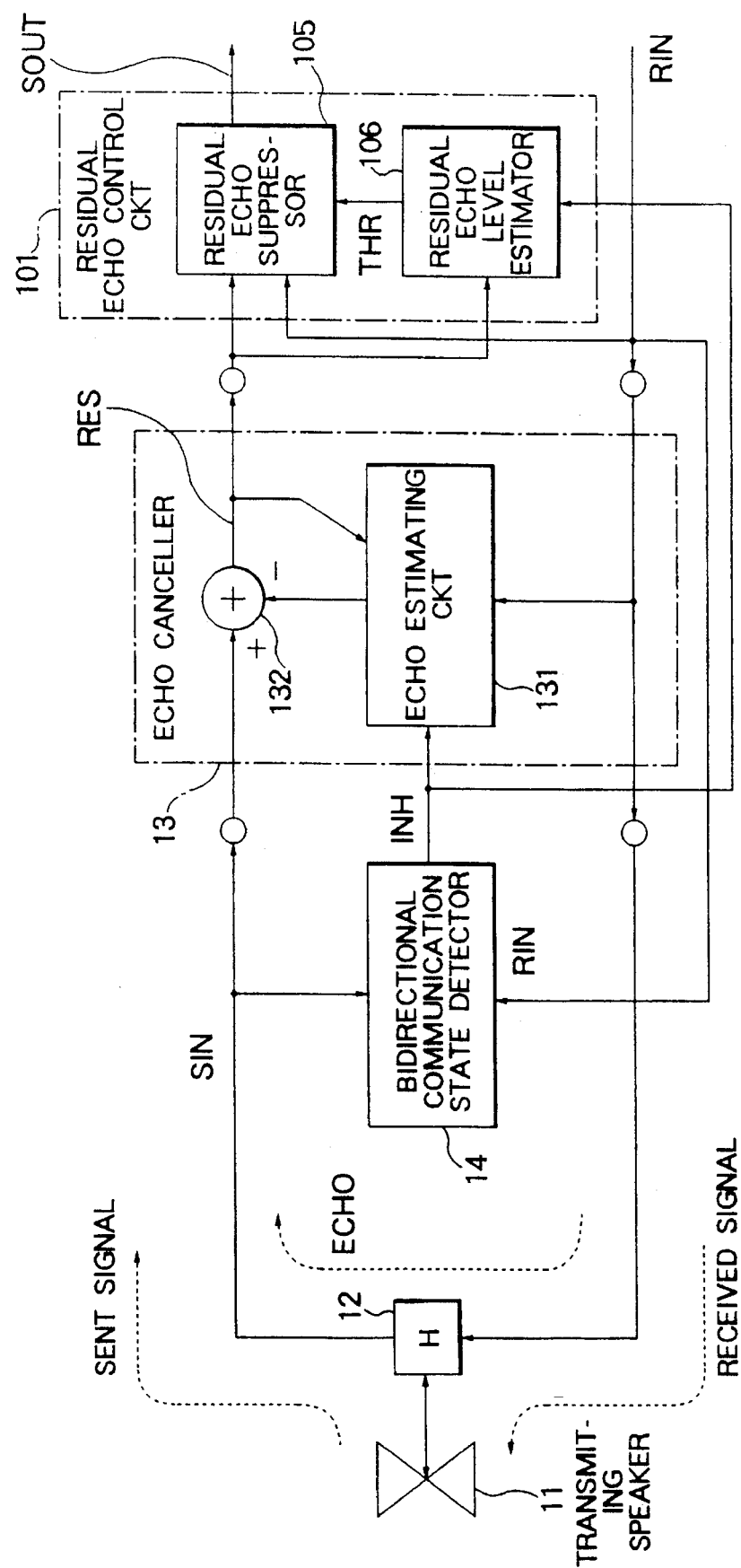
FIG. 3 is a block diagram of an echo cancelling device according to an embodiment of this invention.

Turning to FIG. 3, an echo cancelling device according to a preferred embodiment of this invention comprises similar parts designated by like reference numerals. The echo cancelling device comprises a residual echo control circuit 101 comprising a residual echo suppressor 105 and a residual echo level estimator 106. Responsive to the residual signal RES, the residual echo level estimator 106 estimates a residual echo level in the residual signal RES and produces a threshold signal THR with a threshold level equal to the residual echo level. The residual echo level estimator 106 keeps, in response to the inhibit signal INH, the threshold level at the residual echo level estimated immediately before the inhibit signal INH is produced. Responsive to the receive-in signal RIN, the residual signal RES, and the threshold signal THR, the residual echo suppressor 105 produces the send-out signal SOUT with a residual echo adaptively suppressed in response to the threshold level.

The echo cancelling device of FIG. 3 will be described more in detail. The bidirectional communication state detector 14 is supplied with the send-in signal SIN through the hybrid transformer (H) 12 by the transmitting speaker 11 and with the receive-in signal RIN to detect a bidirectional communication state and to control estimating operation of the echo estimating circuit 131 which estimates by an adaptive FIR (finite impulse response) filter an echo signal resulting from the receive-in signal RIN into the send-in signal SIN. The echo estimating circuit 131 produces the echo estimation signal. The subtracter 132 of the echo canceller 13 subtracts the echo estimation signal from the send-in signal SIN to produce the residual signal RES and controls an echo path estimation operation and suspension of the estimation operation. In this event, the echo estimating circuit 131 is responsive to the receive-in signal RIN and to the residual signal RES and estimates the echo estimation signal so that the residual signal RES becomes equal to zero. The residual echo control circuit 101 controls a residual echo by the residual signal RES and the receive-in signal RIN to produce a send-out signal SOUT.

It is noted here that the bidirectional communication state detector 14 produces the inhibit signal INH when the unidirectional communication state is brought about by the receiving speaker or talker (not shown) which is a counterpart of the transmitting speaker or talker 11. That is, the bidirectional communication state detector 14 produces the inhibit signal INH when the level of the receive-in signal RIN is greater than the level of the send-in signal SIN. The inhibit signal INH prevents the echo estimating circuit 131 from producing the echo estimation signal. The residual echo control circuit 101 comprises the residual echo level estimator 106 for estimating the residual echo level based on the residual signal RES supplied from the echo canceller 13 to produce the threshold signal THR and the residual echo suppressor 105 for adaptively controlling a suppression amount for the residual echo based on the threshold signal THR supplied from the residual echo level estimator 106.

Figure 4:
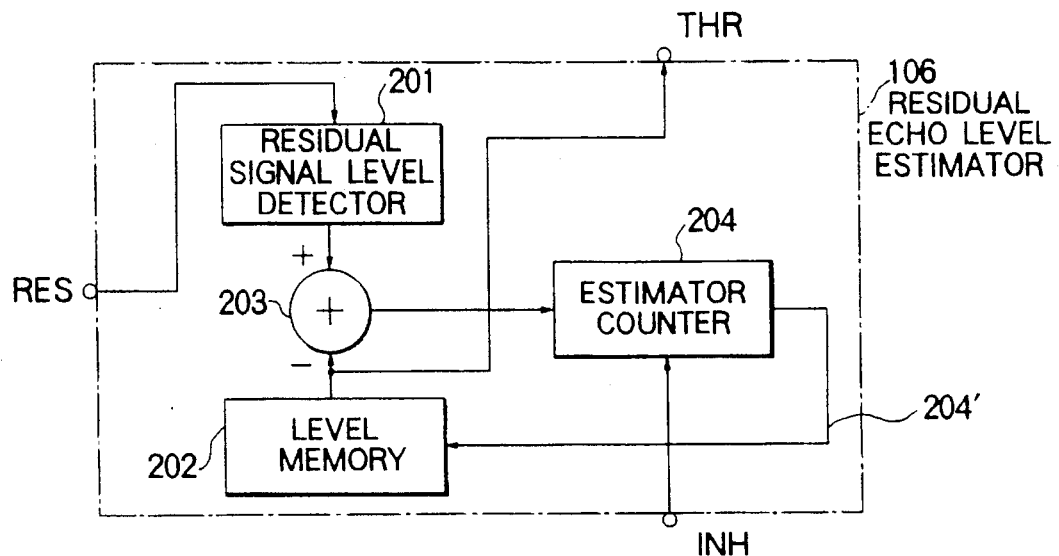
FIG. 4 is a block diagram of a residual echo level estimator of the echo cancelling device illustrated in FIG. 3.

Turning to FIG. 4, the residual echo level estimator comprises a residual signal level detector 201 for detecting a level of the residual signal RES as a residual signal level and a level memory 202 in which an estimated level of the residual echo is stored as a stored level. A subtracter 203 serves as an estimator difference calculator which calculates an estimator level difference equal to the residual signal level minus the stored level. An estimator counter 204 has an estimator count varied by the estimator level difference into an estimator varied count with the estimator varied count kept unvaried when supplied with the inhibit signal INH. A connection line 204' serves as a level varying unit which varies by the estimator varied count the stored level into the residual echo level.

The estimator counter 204 is counted up and down to have the estimator varied count when the estimator level difference is positive and negative. The connection line 204' varies the stored level higher and lower into the residual echo level when the estimator counter 204 is counted up and down.

The estimator counter 204 is counted up and down eventually to have zero and full counts. The connection line 204' varies the stored level by 1 dB when the estimator counter 204 has the zero and the full counts.

The residual echo level estimating circuit 106 will be described more in detail. The residual signal level detector 201 detects a level of the residual signal RES. Stored in the level memory 202 is an estimated value of the residual echo level. The subtracter 203 subtracts an output of the level memory 202 from an output of the residual level detector 201. When the inhibit signal INH is not produced, the estimator counter 204 varies by its counter value the value stored in the level memory 202 with the counter value varied by an output of the subtracter 203. The above-mentioned threshold signal THR is produced with the value stored in the level memory 202.

Figure 5:
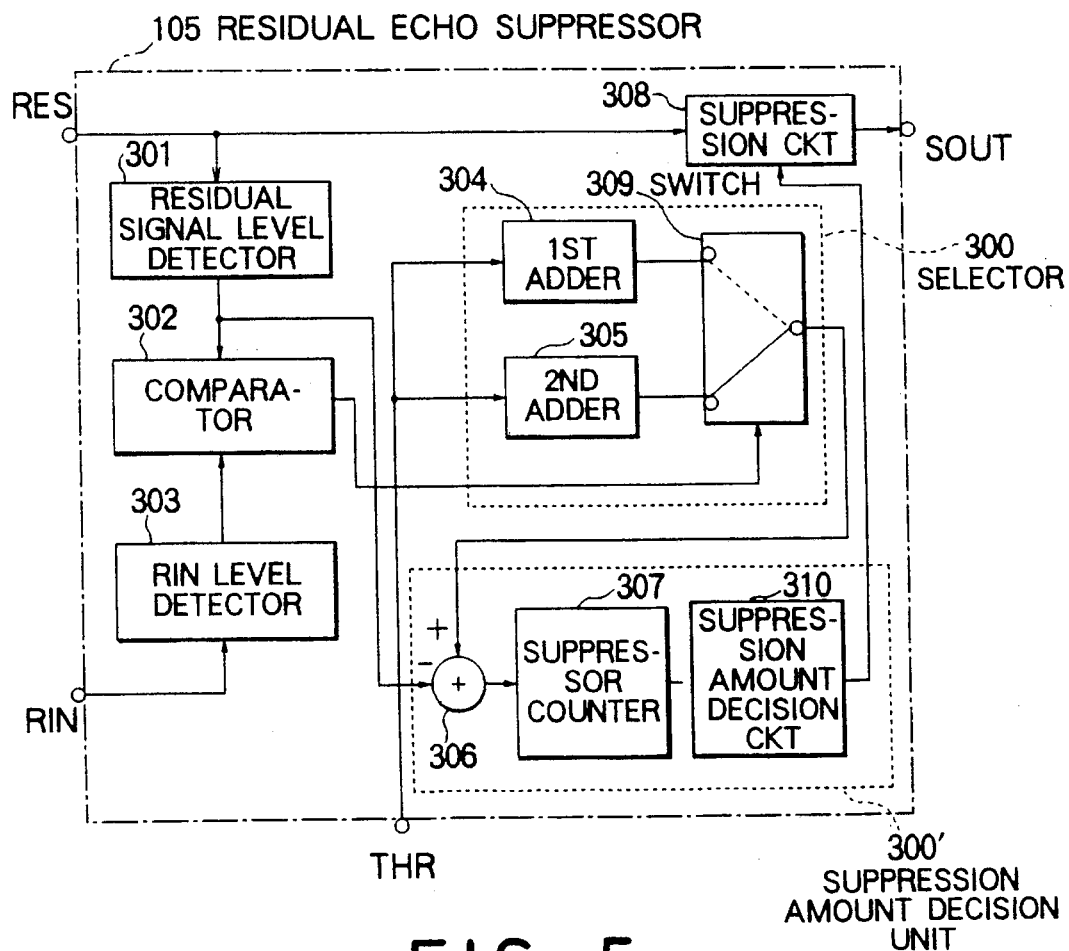
FIG. 5 is a block diagram of a residual echo suppressor of the echo cancelling device illustrated in FIG. 3.

Turning to FIG. 5, the residual echo suppressor 105 comprises a residual signal level detector 301 which is similar in structure and in operation to the residual signal level detector 201. A receive-in signal level detector 303 detects a level of the receive-in signal RIN as a receive-in signal level. Connected to the residual signal level detector 303, a comparator 302 compares the residual signal level with the receive-in signal level of the residual signal level detector 301 to produce a comparator output signal representative of first and second results when the residual signal level is not higher than the receive-in signal level and when the residual signal level is higher than the receive-in signal level.

A selector 300 is responsive to the threshold signal THR and the comparator output signal and selects one of higher and lower levels as a selected level when the comparator output signal represents the first and the second results. The higher level is equal to the threshold level plus a first level (namely, an A level). The lower level is equal to the threshold level plus a second level (namely, a B level) which is lower than the first level (the A level).

A suppression amount deciding unit 300' is responsive to the residual signal level and to the selected level and decides a suppression amount depending on a suppressor level difference equal to the selected level minus the residual signal level to produce a suppression signal indicative of the suppression amount. A suppression circuit 308 is responsive to the residual signal RES and the suppression signal and suppresses the residual echo by the suppression amount to produce the send-out signal SOUT.

The selector 300 comprises a first adder 304 for calculating the higher level by a sum of the threshold level and the first level (A level). A second adder 305 calculates the lower level by a sum of the threshold level and the second level (B level). Responsive to the higher and the lower levels and controlled by the comparator output signal, a switch 309 produces the selected level when the comparator output signal represents the first and the second results.

The suppression amount deciding unit 300' comprises a subtracter 306 which serves as a suppressor difference calculator which calculates the suppressor level difference by subtracting the residual signal level from the selected level. A suppressor counter 307 counts up and down a suppressor count into a suppressor varied count when the suppressor level difference is positive and negative. Responsive to the suppressor varied count, a suppression amount deciding circuit 310 produces the suppression signal with the suppression amount varied by the suppressor varied count.

The suppressor counter 307 counts up and down the suppressor count to have zero and full suppressor counts. In this event, the suppression amount deciding circuit 310 produces the suppression signal with the suppression amount raised and reduced by 1 dB each time when the suppressor count counts up to the full suppressor count and down to the zero count.

The residual echo suppressor 105 will be described more in detail. The residual level detector 301 detects the level of the residual signal RES. The receive-in signal level detector 303 detects a level of the receive-in signal RIN. A comparator 302 compares outputs of the residual signal level detector 301 and of the receive-in signal level detector 303 with each other. The first adder 304 calculates the higher level by a sum of the threshold level and the first level (namely, the level A) as mentioned above. The second adder 305 calculates the lower level by a sum of the threshold level and the second level (namely, the level B). By an output of the comparator circuit 302, the switch 309 switches between an output of the first adder 304 and an output of the second adder 305. The subtracter 306 subtracts the output of the second level detector 301 from an output of the switch 309. The suppressor counter 307 varies its counter value in compliance with an output of the subtracter 306. The suppression amount decision circuit 310 decides the suppression amount in accordance with the output of the suppressor counter 307. The suppression circuit 308 gives the suppression amount to the residual signal RES to produce the send-out signal SOUT.

It is noted here that the residual signal level detector 201 of FIG. 4 may be used as the residual signal level detector 301.

Referring to FIGS. 3 to 5, operation will now be described of the embodiment structured as above in accordance with this invention. In FIG. 3, the residual echo level estimator 106 stably estimates the residual echo level from the residual signal RES produced while the echo path estimation operation is in progress in the echo canceller 13.

More particularly, FIG. 4 will be referred to. The residual signal level detector 201 is supplied with the residual signal RES and measures its level, which is compared with the estimated value stored in the level memory 202. A result of comparison counts up and down the estimator counter 204. The estimated value is incremented and decremented by, for example, 1 dB when the count is equal to zero and when the count is full (for example, 200). In this manner, it becomes possible to obtain a certain threshold level that matches a current channel. This level varies, when initial convergence of the echo canceller 13 is attained, from a great value to a small value and has a relatively great value and a relatively small value when either the channel noise or the background noise is high and when the echo is sufficiently cancelled to reduce the noise level, respectively.

In FIG. 3, based on this threshold level, the residual echo suppressor 105 judges whether or not the signal RES should be suppressed. The suppression amount (for example, attenuation or noise supply) is thereby controlled and adapted to the communication state at that instant of time. The discontinuous feeling and the irrelevant feeling are avoided.

More specifically, FIG. 5 will be referred to. A combination of the residual level detector 301, the receive-in signal level detector 303, and the comparator 302 compares the level of the residual signal RES with the level of the receive-in signal RIN. If the level of the receive-in signal RIN is far higher (for example, 24 dB; in this case, in the unidirectional communication state of the receiving speaker), the first adder 304 calculates a sum of the above-mentioned threshold level and a relatively great value of, for example, 18 dB to provide a suppression amount control threshold value. This relatively great threshold value is compared by the subtracter 306 with the level of the residual signal RES and counts up the suppressor counter 307 up to, for example, 40 to make the suppression amount decision circuit 310 vary the suppression amount towards a great amount (for example, by a pitch of 1 dB).

Either if comparison of the level of the residual signal RES with the level of the receive-in signal RIN shows little difference or if the level of the residual signal RES is higher (in such cases, either in a bidirectional communication state or in a quiescent state), the second adder 305 calculates a sum of the above-mentioned threshold level and a relatively small value of, for example, down to 6 dB to provide a threshold value for control of the suppression amount. This relatively small threshold value is compared by the subtracter 306 with the level of the residual signal RES and counts down the suppressor counter 307 to make the suppression amount decision circuit 310 vary the suppression amount towards a small amount. It should, however, be noted that the threshold value THR is not exceeded in the quiescent state even when the suppression amount is great.

In the manner thus far described, in the echo cancelling device of FIG. 3, the residual echo level estimator 106 stably estimates the residual echo level by the residual signal RES supplied from the echo canceller 13 when the echo estimating circuit 131 estimates the echo estimation signal. Based on an estimated value of the residual echo level, the threshold signal THR is set suitable to a condition of communication channels. By comparing the threshold level of the threshold signal THR with the residual signal RES at the unidirectional communication state of the receiving speaker that is detected by the bidirectional communication state detector 14, the residual echo suppressor 105 stepwise (1 dB) controls the suppression amount which should be given to the residual signal RES. As a result, merits are achieved by this invention such that the channel noise sensitive to the interrupting sound and the background noise are suppressed in various echo paths and such that it is therefore possible to realize communication with no discontinuous feeling and to improve the quality of speech transmission.

What is claimed is:

1. An echo cancelling device comprising:
   an echo canceller responsive to a send-in signal and a receive-in signal for producing a residual signal in which an echo signal is cancelled; and
   a residual echo control circuit which comprises:
      a residual echo level estimator responsive to said residual signal for estimating a residual echo level in said residual signal and for producing a threshold signal with a threshold level equal to said residual echo level; and
      a residual echo suppressor responsive to said receive-in signal, said residual signal, and said threshold signal for producing a send-out signal with a residual echo adaptively suppressed in response to said threshold level.

2. An echo cancelling device as claimed in claim 1, said echo canceller comprising an echo estimating circuit responsive to said receive-in signal and said residual signal for estimating an echo estimation signal and a subtracter for subtracting said echo estimation signal from said send-in signal to produce said residual signal, said echo cancelling device further comprising a communication state detector responsive to said send-in signal and said receive-in signal for producing an inhibit signal when said receive-in signal has a level greater than that of said send-in signal, said inhibit signal preventing said echo estimating circuit from producing said echo estimation signal, wherein said residual echo level estimator keeps, in response to said inhibit signal, said threshold level at the residual echo level estimated immediately before said inhibit signal is produced.

3. An echo cancelling device as claimed in claim 2, wherein said residual echo level estimator comprises:
   a residual signal level detector for detecting a level of said residual signal as a residual signal level;
   a level memory in which an estimated level of said residual echo is stored as a stored level;
   an estimator difference calculator for calculating an estimator level difference equal to said residual signal level minus said stored level;
   an estimator counter having an estimator count varied by said estimator level difference into an estimator varied count with said estimator varied count kept unvaried when supplied with said inhibit signal; and
   level varying means for varying by said estimator varied count said stored level into said residual echo level.

4. An echo cancelling device as claimed in claim 3, wherein:
   said estimator counter is counted up and down to have said estimator varied count when said estimator level difference is positive and negative;
   said level varying means varying said stored level higher and lower into said residual echo level when said estimator counter is counted up and down.

5. An echo cancelling device as claimed in claim 4, wherein:
   said estimator counter is counted up and down eventually to have zero and full counts;
   said level varying means varying said stored level by 1 dB when said estimator counter has said zero and said full counts.

6. An echo cancelling device as claimed in claim 3, wherein said residual echo suppressor comprises:
   a receive-in signal level detector for detecting a level of said receive-in signal as a receive-in signal level;
   a comparator connected to said residual signal level detector for comparing said residual signal level with said receive-in signal level to produce a comparator output signal representative of first and second results when said residual signal level is not higher than said receive-in signal level and when said residual signal level is higher than said receive-in signal level;
   a selector responsive to said threshold signal and said comparator output signal for selecting one of higher and lower levels as a selected level when said comparator output signal represents said first and said second results, said higher level being equal to said threshold level plus a first level, said lower level being equal to said threshold level plus a second level which is lower than said first level;
   a suppression amount deciding unit responsive to said residual signal level and to said selected level deciding a suppression amount depending on a suppressor level difference equal to said selected level minus said residual signal level to produce a suppression signal indicative of said suppression amount; and
   a suppression circuit responsive to said residual signal and said suppression signal for suppressing said residual echo by said suppression amount to produce said send-out signal.

7. An echo cancelling device as claimed in claim 6, wherein said selector comprises:
   a first adder for calculating said higher level by a sum of said threshold level and said first level;
   a second adder for calculating said lower level by a sum of said threshold level and said second level; and
   a switch responsive to said higher and said lower levels and controlled by said comparator output signal for producing said selected level when said comparator output signal represents said first and said second results.

8. An echo cancelling device as claimed in claim 6, wherein said suppression amount deciding unit comprises:
   a suppressor difference calculator for calculating said suppressor level difference by subtracting said residual signal level from said selected level;
   a suppressor counter for counting up and down a suppressor count into a suppressor varied count when said suppressor level difference is positive and negative; and
   a suppression amount deciding circuit responsive to said suppressor varied count for producing said suppression signal with said suppression amount varied by said suppressor varied count.

9. An echo cancelling device as claimed in claim 8, wherein:
   said suppressor counter counts up and down said suppressor count to have zero and full suppressor counts;
   said suppression amount deciding circuit producing said suppression signal with said suppression amount raised and reduced by 1 dB each time when said suppressor counter counts up to said full suppressor count and down to said zero suppressor count.

* * * * *